United States Patent
Teramae

(10) Patent No.: US 7,658,981 B2
(45) Date of Patent: *Feb. 9, 2010

(54) INKJET RECORDING MEDIUM

(75) Inventor: Shinichi Teramae, Minami-Ashigara (JP)

(73) Assignee: FUJIFILM Corporation, Tokyo (JP)

( * ) Notice: Subject to any disclaimer, the term of this patent is extended or adjusted under 35 U.S.C. 154(b) by 215 days.

This patent is subject to a terminal disclaimer.

(21) Appl. No.: 11/815,511

(22) PCT Filed: Feb. 3, 2006

(86) PCT No.: PCT/JP2006/302303

§ 371 (c)(1), (2), (4) Date: Aug. 3, 2007

(87) PCT Pub. No.: WO2006/083033

PCT Pub. Date: Aug. 10, 2006

(65) Prior Publication Data

US 2009/0022910 A1    Jan. 22, 2009

(30) Foreign Application Priority Data

Feb. 4, 2005    (JP) ............................. 2005-029789

(51) Int. Cl.
B41M 5/40 (2006.01)
(52) U.S. Cl. .............. 428/32.26; 428/32.27; 428/32.28; 428/32.3; 428/32.31; 428/32.34
(58) Field of Classification Search .............. 428/32.26, 428/32.27, 32.28, 32.3, 32.31, 32.34
See application file for complete search history.

(56) References Cited

U.S. PATENT DOCUMENTS

| 2002/0140796 | A1 | 10/2002 | Sumioka et al. |
| 2003/0203133 | A1 | 10/2003 | Maekawa |
| 2004/0218917 | A1 | 11/2004 | Mizutani et al. |
| 2004/0246321 | A1* | 12/2004 | Takashima et al. .......... 347/100 |
| 2008/0020152 | A1 | 1/2008 | Watanabe et al. |

FOREIGN PATENT DOCUMENTS

| EP | 1219459 A2 | 7/2002 |
| EP | 1346842 A2 | 9/2003 |
| EP | 1459901 A2 | 9/2004 |
| EP | 1 484 189 A2 | 12/2004 |
| EP | 1571004 A1 | 9/2005 |
| JP | 58393 B2 | 2/1993 |
| JP | 08-164589 A | 6/1996 |
| JP | 2605585 B2 | 2/1997 |
| JP | 2650604 B2 | 5/1997 |
| JP | 10203006 A | 8/1998 |
| JP | 10217601 A | 8/1998 |
| JP | 10-268111 A | 10/1998 |
| JP | 10-282312 A | 10/1998 |
| JP | 1120306 A | 1/1999 |
| JP | 11-58943 A | 3/1999 |
| JP | 2001-281411 A | 10/2001 |
| JP | 2004-249522 A | 9/2004 |
| JP | 2004-249524 A | 9/2004 |
| JP | 2004-284147 A | 10/2004 |
| JP | 2004284147 A | 10/2004 |
| JP | 2004-351741 A | 12/2004 |
| JP | 2004351618 A | 12/2004 |
| JP | 20057849 A | 1/2005 |
| JP | 2006-56196 A | 3/2006 |

OTHER PUBLICATIONS

EP Communication, dated Feb. 26, 2009, issued in corresponding EP Application No. 06713446.0, 7 pages.
Extended European Search Report from the EPO dated Feb. 12, 2009.
International Search Report PCT/JP2006/300788.

* cited by examiner

*Primary Examiner*—Betelhem Shewareged
(74) *Attorney, Agent, or Firm*—Sughrue Mion, PLLC

(57) ABSTRACT

An inkjet recording medium comprising a support and an ink-receiving layer on a support, wherein the hardness of the ink-receiving layer is 9.0 or more; and the D/I value of the ink-receiving layer defined by ASTM E430 is 40 or more, or an inkjet recording medium comprising a support and an ink-receiving layer on a support, wherein the hardness of the ink-receiving layer is 9.0 or more; and the center surface average roughness (SRa) of the ink-receiving layer is 0.1 μm or less when measured under the condition of cutoff of 0.02 to 0.5 mm, and 0.4 μm or less when measured under the condition of cutoff of 1 to 3 mm.

24 Claims, No Drawings

INKJET RECORDING MEDIUM

TECHNICAL FIELD

The present invention relates to an inkjet recording medium that is used in an image recording method with an inkjet system, in more detail, an inkjet recording medium that has excellent image clarity and is excellent in the scratch resistance and in suppression of the bleeding over time of an obtained image.

BACKGROUND ART

In recent years, with the rapid advance of the information industry, various information processing systems have been developed, and recording methods and units suitable for the information processing systems have been developed as well and put into practical use. Among the recording methods, an inkjet recording method, being capable of recording on many kinds of recording materials, relatively cheap and compact in the hard (system), and excellent in the quietness, is in wide use not only in offices but also in homes.

Furthermore, with the advance of higher resolving power of recent inkjet printers, so-called photograph-like high quality image recorded matters have become obtainable; that is, recording materials have been as well variously developed. From the viewpoint of possessing the commercial value as the recording material, excellent ink-absorbing property and image storability after recording, that is, non-bleaching property of an image during a long storage and non-deteriorating property of image quality due to bleeding are in demand.

As one of which ink absorption is improved, inkjet recording media in which an ink-receiving layer that has a three-dimensional structure that is made of inorganic pigment particles and a water soluble resin and has a high porosity is disposed are disclosed in Japanese Patent Application Laid-Open (JP-A) Nos. 10-203006, 10-217601, 11-20306. These are assumed capable of forming high definition images. However, in the inkjet recording media, during storage after printing, there is a problem in that the solvent diffuses together with a dye in the ink-receiving layer to cause the bleeding of an image (so-called "bleeding over time"). A recording medium having a porous layer formed by coating a mixture of porous silica particles and a pseudo-boehmite sol together with a binder is proposed as well in Japanese Patent Application Publication (JP-B) No.2650604. Surely, high ink absorption is exhibited and the color purity of printed matters can be improved. However, the bleeding over time cannot be successfully inhibited.

On the other hand, recording media where a silica porous layer is disposed as an underlayer and thereon a porous layer containing alumina or alumina hydrate is further laminated are described in JP-B Nos. 5-8393, 2605585. Owing to a configuration of the recording media, the ink absorption can be surely improved. However, the outermost layer containing alumina or alumina hydrate, being poor in the surface strength, is poor in the scratch resistance. Accordingly, there is a disadvantage in that a surface of the layer is likely to be damaged during handling.

As mentioned above, at present, an inkjet recording medium that can satisfy the bleeding over time of formed images and the scratch resistance thereof is not yet provided.

DISCLOSURE OF INVENTION

The invention can provide an inkjet recording medium that has excellent image clarity and is excellent in the scratch resistance and in suppression of the bleeding over time of an obtained image.

A first aspect of the present invention is to provide An inkjet recording medium comprising a support and an ink-receiving layer on the support, wherein the hardness of the ink-receiving layer is 9.0 or more; and the D/I value, defined by ASTM E430, of the ink-receiving layer is 40 or more.

A second aspect of the present invention is to provide a support and an ink-receiving layer on the support, wherein the hardness of the ink-receiving layer is 9.0 or more; and the center surface average roughness (SRa) of the ink-receiving layer is 0.1 µm or less when measured under a condition of cutoff of 0.02 to 0.5 mm, and 0.4 µm or less when measured under a condition of cutoff of 1 to 3 mm.

BEST MODE FOR CARRYING OUT THE INVENTION

A first inkjet recording medium of the invention comprises a support and an ink-receiving layer on the support, wherein the hardness of the ink-receiving layer is 9.0 or more and the D/I value defined of the ink receiving layer by ASTM E430 is 40 or more.

Furthermore, a second inkjet recording medium of the invention comprises a support and an ink-receiving layer on the support, wherein the hardness of the ink-receiving layer is 9.0 or more and the center surface average roughness (SRa) of the ink-receiving layer is 0.1 µm or less when measured under the condition of cutoff of 0.02 to 0.5 mm, and 0.4 µm or less when measured under the condition of cutoff of 1 to 3 mm.

Furthermore, in the first and second inkjet recording media, the image clarity of the ink-receiving layer is preferably 80% or more when measured under the condition of optical comb width of 2.0 mm. The image clarity is based on JIS-H8686-2. The disclosure is incorporated of reference herein.

Still furthermore, the ink-receiving layer of the inkjet recording medium of the invention, depending on an object or need, may comprise a water soluble resin, cross-linking agent, particles, a mordant and other additives. Furthermore, the support may further have another layer. In the invention, the ink-receiving layer is preferably formed on the support by use of a Wet on Wet method described below.

In what follows, essential configurations of the invention will be detailed.

Ink-Receiving Layer

Hardness

The ink-receiving layers of the first and second inkjet recording media of the invention (hereinafter, simply referred to as "inkjet recording medium of the invention") have the hardness of 9.0 or more. When an inkjet recording medium goes past a transportation system of an inkjet printer, in some cases, it receives stress; accordingly, the ink-receiving layer necessarily has sufficient film strength. Furthermore, when the inkjet recording medium is cut in sheet, in order to inhibit the ink-receiving layer from cracking and peeling as well, the ink-receiving layer is necessary to have sufficient film strength. When the hardness of an inkjet recording medium is less than 9.0, excellent scratch resistance cannot be obtained. That is, above-mentioned requirements cannot be satisfied. In addition, when the inkjet recording medium of the invention has an ink-receiving layer having the hardness of 9.0 or more, the bleeding over time of an obtained image can be effectively suppressed.

The hardness of the ink-receiving layer is preferably 10.0 or more and particularly preferably 11.0 or more. The upper limit of the hardness is not particularly set; however, it is preferably 100 or less.

The "hardness" in the invention is the ultra-micro hardness measured with a dynamic ultra-micro hardness tester (trade name: DUH-201, manufactured by Shimadzu Corporation). In the invention, a weight of 0.5 gf (=4.9 mN) is applied on a triangular pyramid stylus of 115° for 5 sec, and, from an indentation depth after removal of the weight, a value of the hardness is obtained according to an equation below.

$$H=37.838P/h^2$$

H=dynamic ultra-micro hardness
P=test weight (gf) and
h=indentation depth after removal of the weight (μm)

Center Surface Average Roughness (SRa)

The center surface average roughness (SRa) is an average roughness obtained by three-dimensionally scanning the roughness of a definite plane, which is different from the center line roughness (Ra value) obtained by linearly scanning the roughness of a plane. The irregularities on a surface of a base material are not uniform and there are wavy irregularities having various wavelengths. The measurement under the condition of the cutoff of 0.02 to 0.5 mm means to measure the irregularities having wavelengths in the range of 0.02 to 0.5 mm. And the measurement under the condition of the cutoff of 1 to 3 mm means to measure the irregularities having wavelengths in the range of 1 to 3 mm.

In the ink-receiving layer in the second inkjet recording medium of the invention, the center surface average roughness is indispensably 0.1 μm or less when measured under the condition of the cutoff of 0.02 to 0.5 mm, and indispensably 0.4 μm or less when measured under the condition of the cutoff of 1 to 3 mm. In the inkjet recording medium that does not satisfy any one of the indispensable requirements, excellent image clarity cannot be obtained.

A more preferable value of the center surface average roughness (SRa) is 0.085 μm or less when measured under the condition of the cutoff of 0.02 to 0.5 mm, and 0.25 μm or less when measured under the condition of the cutoff of 1 to 3 mm, and a particularly preferable value thereof is in the range of 0.01 to 0.07 μm when measured under the condition of the cutoff of 0.02 to 0.5 mm, and in the range of 0.05 to 0.2 μm when measured under the condition of the cutoff of 1 to 3 mm.

Now, a measurement method of the center surface average roughness (SRa) in the invention will be described.

The measurement of the center surface average roughness (SRa) under the condition of cutoff of 0.02 to 0.5 mm is carried out with a three-dimensional surface structure analysis microscope (trade name: Zygo New View 5000, manufactured by Zygo Corp.) based on measurement and analysis conditions below.

Measurement and Analysis Conditions

Measured length: 10 mm in X-direction and 10 mm in Y-direction
Object lens: 2.5 times, and
Band-pass filter: 0.02 to 0.5 mm The measurement of the center surface average roughness (SRa) under the condition of cutoff of 1 to 3 mm is carried out with a surface shape analyzer (trade name: Nanometro 110F, manufactured by KURODA Precision Industries Ltd.) based on measurement and analysis conditions below.

Measurement and Analysis Conditions

Scanning direction: MD direction of sample
Measured length: 50 mm in X-direction and 30 mm in Y-direction
Measurement pitch: 0.1 mm in X-direction and 1.0 mm in Y-direction Scanning speed: 20 mm/sec and
Band-pass filter: 1 to 3 mm The center surface average roughness (SRa) of a surface of the ink-receiving layer can be controlled by controlling the roughness of a surface of the support that is an underlayer thereof (for instance, by applying a calender process on a paper base, applying a calender process on a support, disposing a coat layer or a thermoplastic resin-containing layer, or applying a mirror process (cast) on a coat layer) or by increasing a thickness of the ink-receiving layer itself.

D/I Value

Furthermore, in the ink-receiving layer in the first inkjet recording medium of the invention, the D/I value defined by the ASTM E430 (the disclosure of which is incorporated of reference herein) is indispensably 40 or more, preferably 45 or more, and more preferably 50 or more. The higher the D/I value is, the better. When the inkjet recording medium has the ink-receiving layer of which D/I value defined in the ASTM E430 is 40 or more, a blurring degree of an image can be suppressed and thereby an image having excellent image clarity can be obtained.

The D/I value in the invention is obtained by measuring a black solid image recorded with inkjet recording ink based on a D/I value test method defined by the ASTM E430 by use of DGM-30 (manufactured by Murakami Color Research Laboratory Co., Ltd.).

The D/I value can be controlled through the control of the center surface average roughness (SRa) of the surface of the ink-receiving layer. That is, the D/I value can be controlled through the control of the surface roughness of the support that is an underlayer (for instance, by applying a calender process on a paper base, applying a calender process on a support, disposing a coat layer or a thermoplastic resin-containing layer, or applying a mirror process (cast) on a coat layer) or an increase in a thickness of the ink-receiving layer itself.

Image Clarity

Furthermore, in the ink-receiving layers in the first and second inkjet recording media of the invention, the image clarity of ink-receiving layer in conformity with JIS-H8686-2 (1999) (the disclosure of which is incorporated of reference herein) is, when measured under the condition of optical comb width of 2.0 mm, preferably 80% or more, more preferably 85% or more and still more preferably 90% or more. The nearer to 100% the image clarity is, the better. When the inkjet recording medium of the invention has the ink-receiving layer of which image clarity in conformity with JIS-H8686-2 (1999) is 80% or more, the blurring degree of an image can be suppressed and thereby an image having excellent image clarity can be obtained.

Now, a measurement method of image clarity will be described.

In the invention, based on an image clarity test method defined by JIS-H8686-2, the image clarity of a black solid image recorded with inkjet recording ink can be measured by use of an image clarity meter (trade name: ICM-1, manufactured by Suga Test Instruments Co., Ltd.) under the measurement and analysis conditions below.

Measurement and Analysis Conditions

Measurement method: reflection
Measurement angle: 60° and
Optical comb: 2.0 mm

The image clarity of the ink-receiving layer, similarly to the above, can be controlled through the control of the center surface average roughness (SRa) of the surface of the ink-receiving layer. That is, the image clarity can be controlled through the control of the surface roughness of the support that is an underlayer (for instance, by applying a calender process on a paper base, applying a calender process on a support, disposing a coat layer or a thermoplastic resin-containing layer, or applying a mirror process (cast) on a coat layer) or an increase in a thickness of the ink-receiving layer itself.

In what follows, ingredients constituting the ink-receiving layer of the invention will be described.

Water Soluble Resin

The ink-receiving layer according to the invention preferably comprises a water soluble resin.

The water soluble resins include, for instance, polyvinyl alcohol based resins that has a hydroxy group as a hydrophilic constituent unit (polyvinyl alcohol (PVA), acetoacetyl-modified polyvinyl alcohol, cation-modified polyvinyl alcohol, anion-modified polyvinyl alcohol, silanol-modified polyvinyl alcohol and polyvinyl acetal), cellulose base resins (methyl cellulose (MC), ethyl cellulose (EC), hydroxyethyl cellulose (HEC), carboxymethyl cellulose (CMC), hydroxypropyl cellulose (HPC), hydroxyethylmethyl cellulose and hydroxypropylmethyl cellulose), chitins, chitosans, starch, resins having an ether bond (polyethylene oxide (PEO), polypropylene oxide (PPO), polyethylene glycol (PEG) and polyvinyl ether (PVE)) and resins having a carbamoyl group (polyacrylamide (PAAM), polyvinylpyrrolidone (PVP) and polyacrylic acid hydrazide). Furthermore, the water soluble resins include polyacrylic acid salts having a carboxyl group as a dissociating group, maleic acid resins, algic acid salts and gelatins.

Among these, polyvinyl alcohol based resins are particularly preferable.

In order to prevent reduction of layer strength or layer cracking at the time t when the layer is dried, due to too small a content of the water-soluble resin, and prevent reduction of ink absorbing ability caused by blocking of voids by resin due to too high a content of resin, the content of the water-soluble resin in the ink receiving layer is preferably 9 to 40%, more, preferably 12 to 33% by mass with respect to the total solid mass in ink receiving layer.

These water-soluble resins and the particles described below, which constitute mainly the ink receiving layer, each may be a single-component substance or combinations of multiple components.

From the viewpoint of preventing cracking of the layer, the number average polymerization degree of the polyvinyl alcohol is preferably 1800 or more, more preferably 2000 or more. From the view point of transparency of the layer, when water soluble resin is used in combination with the silica particles, the kind of water soluble resin is important. For combination with anhydrous silica, polyvinyl alcohol based resins are preferable as the water-soluble resin. Among them, polyvinyl alcohol based resins having a saponification degree of 70 to 99% are preferable.

As the polyvinyl alcohol based resins, derivatives of the specific example are also included, and the polyvinyl alcohol based resins may be used singularly or in a combination of two or more kinds.

The above polyvinyl alcohol based resins contain a hydroxyl group as a structural unit. Hydrogen bonding between the hydroxyl groups and the surface silanol groups on silica particles allows the silica particles to form a three-dimensional network structure having secondary particles as the network chain units. This three-dimensional network structure thus constructed seems to be the cause of easier development of an ink receiving layer having a porous structure having a higher void percentage.

In ink jet recording media the ink receiving layer having a porous structure obtained in this manner absorbs inks rapidly due to the capillary phenomenon, and provides printed dots superior in circularity without ink bleeding.

Particles

Generally, the ink receiving layer according to the present invention preferably contains particles.

The above particles are preferably inorganic particles (particularly, inorganic pigment particles). Examples of inorganic particles include particles of silica particles, colloidal silica, titanium dioxide, barium sulfate, calcium silicate, zeolite, kaolinite, halloysite, mica, talc, calcium carbonate, magnesium carbonate, calcium sulfate, alumina particles, boehmite, pseudoboehmite. Among these particles, silica particles, colloidal silica, alumina particles, and pseudoboehmite are preferable. Particularly, vapor-phase process silica particles are preferable.

The silica particles in the above have an extremely high specific surface area, accordingly it provides the layer with a higher ink absorption and retention capacity. In addition, the silica particles have a low refractive index, and thus if dispersed to a suitable particle diameter, provides the ink receiving layer with better transparency, and higher color density and favorable coloring is obtainable. The transparency of ink receiving layer is important from the viewpoint of obtaining a high color density and favorable coloring glossiness not only for applications wherein the transparency is required such as OHP sheets and the like, but also for applications as recording sheets such as photographic glossy papers and the like.

The average primary particles diameter of the inorganic pigment particles are preferably 20 nm or less, more preferably 15 nm or less, and particularly preferably 10 nm or less. When the average primary particle size of the particles are 20 nm or less, the ink-absorbing property can be effectively improved and at the same time, the glossiness of the surface of the ink receiving layer can be enhanced.

In particular with silica particles, since the surface has silanol groups, there is easy adhesion between the particles through the hydrogen bonding of the silanol groups, and there is an adhesion effect between the particles through the silanol groups and the water soluble resin. Hence, if the average primary size of the particles are 20 nm or below, then the porosity ratio of the ink receiving layer is high, and a structure with high transparency can be formed, and the ink absorption ability characteristics can be effectively raised.

Silica particles are commonly classified roughly into wet method particles and dry method (vapor phase process) particles according to the method of manufacture. By the wet method, silica particles are mainly produced by generating an activated silica by acid decomposition of a silicate, polymerizing to a proper degree the activated silica, and coagulating the resulting polymeric silica to give a hydrated silica. Alternatively by the gas phase process, vapor-phase process silica (anhydrous silica) particles are mainly produced by high-temperature vapor-phase hydrolysis of a silicon halide (flame hydrolysis process), or by reductively heating and vaporizing quartz and coke in an electric furnace by applying an arc discharge and then oxidizing the vaporized silica with air (arc method).

The vapor-phase process silica is different in the density of silanol groups on the surface and the presence of voids therein and exhibits different properties from hydrated silica. The vapor-phase process silica is suitable for forming a three-dimensional structure having a higher void percentage. The reason is not clearly understood. In the case of hydrated silica particles have a higher density of 5 to 8 silanol groups/nm$^2$ on their surface. Thus the silica particles tend to coagulate densely. While the vapor phase process silica particles have a lower density of 2 to 3 silanol groups/nm$^2$ on their surface. Therefore, vapor-phase process silica seems to cause more scarce, softer coagulations (flocculates), consequently leading to a structure having a higher void percentage.

In the invention, the vapor-phase process silica (anhydrous silica) obtained by the dry method is preferable, with the surface of the silica particles having a density of 2 to 3 silanol groups/nm$^2$.

Ratio of the Particles to the Water-soluble Resin Contained

The ratio (PB ratio: x/y, inorganic pigment particles to water soluble resin 1 part by mass) of the mass of particles (preferably silica particles; x) to the mass of water-soluble resin (y) has a great influence on the structure and strength of the ink receiving layer. A larger weight ratio (PB ratio) tends to result in increase in void percentage, pore volume, and surface area (per unit mass).

When an inkjet recording medium goes past a transportation system of an inkjet printer, in some cases, it receives stress; accordingly, the ink-receiving layer necessarily has sufficient film strength. Furthermore, when the inkjet recording medium is cut in sheet, in order to inhibit the ink-receiving layer from cracking and peeling as well, the ink-receiving layer is necessary to have sufficient film strength. Thus the PB ratio is preferably 4.5 or less from the viewpoint of improving hardness of the ink-receiving layer. Further the PB ratio is more preferably 4.3 or less, still preferably 4.15 or less. Though not particularly restricted, in order to prevent reduction of ink absorbing ability caused by blocking of voids by resin, the PB ratio is preferably 1.5 or more. Furthermore, from the viewpoint of assuring high speed ink absorbing, the PB ratio is preferably 2.0 or more.

For example, when a coating liquid, containing vapor-phase process silica particles, having an average primary particle diameter of 20 nm or less, and a water-soluble resin homogeneously dispersed in an aqueous solution at a PB ratio (x/y) of between 2/1 and 4.5/1, is applied and dried on a support, a three-dimensional network structure having the secondary particles of silica particles as the network chains is formed. Such a coating liquid easily provides a translucent porous layer having an average void diameter of 30 nm or less, a void percentage of 50 to 80%, a void specific volume of 0.5 ml/g or more, and a specific surface area of 100 m$^2$/g or more.

Cross-linking Agent

With respect to the ink receiving layer according to the invention, it is preferable that the layer containing particles, a water-soluble resin, and the like, contains additionally a cross-linking agent that allows cross-linking of the water-soluble resin, and thus is a porous layer hardened by the cross-linking reaction between the cross-linking agent and the water-soluble resin. By adding the cross-linking agent, the water-soluble resin is cross-linked, as a result, a highly hardened ink receiving layer can be obtained.

The above cross-linking agent may be selected appropriately in relation to the water-soluble resin contained in the ink receiving layer, but boron compounds are preferable, as they allow faster cross-linking reaction. Examples of the boron compounds include borax, boric acid, borate salts [e.g., orthoborate salts, InBO$_3$, ScBO$_3$, YBO$_3$, LaBO$_3$, Mg$_3$(BO$_3$)$_2$, and CO$_3$(BO$_3$)$_2$], diborate salts [e.g., Mg$_2$B$_2$O$_5$, and CO$_2$B$_2$O$_5$], metaborate salts [e.g., LiBO$_2$, Ca(BO$_2$)$_2$, NaBO$_2$, and KBO$_2$], tetraborate salts [e.g., Na$_2$B$_4$O$_7$.10H$_2$O], pentaborate salts [e.g., KB$_5$O$_8$.4H$_2$O, Ca$_2$B$_6$O$_{11}$.7H$_2$O, and CsB$_5$O$_5$], and the like. Among them, borax, boric acid and borates are preferable since they are able to promptly cause a cross-linking reaction. Particularly, boric acid is preferable, and the combination of polyvinyl alcohol and boric acid is most preferred.

The cross-linking agent of the vinyl alcohol preferably includes the following compounds in addition to the brome compounds.

Examples of such cross-linking agents include: aldehyde compounds such as formaldehyde, glyoxal and glutaraldehyde; ketone compounds such as diacetyl and cyclopentanedione; active halogen compounds such as bis(2-chloroethylurea)-2-hydroxy-4,6-dichloro-1,3,5-triazine and 2,4-dichloro-6-S-triazine sodium salt; active vinyl compounds such as divinyl sulfonic acid, 1,3-vinylsulfonyl-2-propanol, N,N'-ethylenebis(vinylsulfonylacetamide) and 1,3,5-triacryloyl-hexahydro-S-triazine; N-methylol compounds such as dimethylolurea and methylol dimethylhydantoin; melamine resin such as methylolmelamine and alkylated methylolmelamine; epoxy resins; isocyanate compounds such as 1,6-hexamethylenediisocyanate; aciridine compounds such as those described in U.S. Pat. Nos. 3,017,280 and 2,983,611; carboxyimide compounds such as those described in U.S. Pat. No. 3,100,704; epoxy compounds such as glycerol triglycidyl ether; ethyleneimino compounds such as 1,6-hexamethylene-N,N'-bisethylene urea; halogenated carboxyaldehyde compounds such as mucochloric acid and mucophenoxychloric acid; dioxane compounds such as 2,3-dihydroxydioxane; metal-containing compounds such as titanium lactate, aluminum sulfate, chromium alum, potassium alum, zirconyl acetate and chromium acetate; polyamine compounds such as tetraethylene pentamine; hydrazide compounds such as adipic acid dihydrazide; and low molecular compounds or polymers containing at least two oxazoline groups.

Furthermore, as the cross-linking agent of the water soluble resin in the invention, polyvalent metal compounds cited below are also preferable. The polyvalent metal compound not only works as the cross-linking agent but also further improves the ozone resistance, image bleeding and glossiness.

As the polyvalent metal compound, water-soluble compounds are preferable. Examples thereof include calcium acetate, calcium chloride, calcium formate, calcium sulfate, barium acetate, barium sulfate, barium phosphate, manganese chloride, manganese acetate, manganese formate dihydrate, manganese ammonium sulfate hexahydrate, cupric chloride, ammonium copper (II) chloride dihydrate, copper sulfate, cobalt chloride, cobalt thiocyanate, cobalt sulfate, nickel sulfate hexahydrate, nickel chloride hexahydrate, nickel acetate tetrahydrate, nickel ammonium sulfate hexahydrate, nickel amidesulfate tetrahydrate, aluminum sulfate, aluminum alum, aluminum sulfite, aluminum thiosulfate, polyaluminum chloride, aluminum nitrate nonahydrate, aluminum chloride hexahydrate, ferrous bromide, ferrous chloride, ferric chloride, ferrous sulfate, ferric sulfate, zinc phenolsulfonate, zinc bromide, zinc chloride, zinc nitrate hexahydrate, zinc sulfate, titanium tetrachloride, tetraisopropyl titanate, titanium acetyl acetonate, titanium lactate, zirconium acetyl acetonate, zirconyl acetate, zirconyl sulfate, zirconyl ammonium carbonate, zirconyl stearate, zirconyl octylate, zirconyl nitrate, zirconium oxychloride, zirconium hydroxychloride, chromium acetate, chromium sulfate, magnesium sulfate, magnesium chloride hexahydrate, magnesium citrate nonahydrate, sodium phosphorustungstate, sodium tungsten citrate, 12 tungstophosphoric acid n-hydrate, 12 tungstosilic acid 26-hydrate, molybdenum chloride, 12-molybdophosphoric acid n-hydrate, gallium nitrate, germanium nitrate, strontium nitrate, yttrium acetate, yttrium chloride, yttrium nitrate, indium nitrate, lanthanum nitrate, lanthanum chloride, lanthanum acetate, lanthanum benzoate, cerium chloride, cerium sulfate, cerium octylate, praseodymium nitrate, neodymium nitrate, samarium nitrate, europium nitrate, gadolinium nitrate, dysprosium nitrate, erbium nitrate, ytterbium nitrate, hafnium chloride and bismuth nitrate.

Among the foregoing polyvalent metal compounds, preferable example include aluminum-containing compounds (water-soluble aluminum compounds) such as aluminum sulfate, aluminum alum, aluminum sulfate, aluminum thiosulfate, polyaluminum chloride, aluminum nitrate nonahydrate and aluminum chloride hexahydrate; zirconyl-containing compounds (water-soluble zirconyl compounds) such as zirconyl acetyl acetonate, zirconyl acetate, zirconyl sulfate, zirconyl ammonium carbonate, zirconyl stearate, zirconyl octylate, zirconyl nitrate, zirconium oxychloride and zirconium hydroxychloride; and titanium-containing compounds such as titanium tetrachloride, tetraisopropyl titanate, titanium acetyl acetonate and titanium lactate. Among these, polyaluminum chloride, zirconyl acetate, zirconyl ammonium carbonate and zirconyl oxychloride are particularly preferable.

As the cross-linking agent in the invention, among above-cited compounds, boron compounds and zirconyl compounds are particularly preferable.

In the invention, the cross-linking agent is contained, relative to the water soluble resin, preferably in the range of 5 to 50% by mass and more preferably in the range of 8 to 30% by mass. When the cross-linking agent is contained within the above range, the water soluble resin can be effectively crosslinked to increase the hardness of the ink-receiving layer, resulting in inhibiting the cracking from occurring and thereby obtaining excellent scratch resistance.

The cross-linking agents may be used singularly or in a combination of two or more kinds. From viewpoints of working as a preferable cross-linking agent and of further improving the ozone resistance, image bleeding resistance and glossiness, the polyvalent metal compound (particularly preferably, the zirconyl compound) is contained, relative to the water soluble resin, preferably at least by 0.1% by mass or more, more preferably by 0.5% by mass or more and particularly preferably by 1.0% by mass or more. Furthermore, the upper limit of the content of the polyvalent metal compound, though not particularly restricted, from viewpoints of the image density, ink absorption and suppression of curl of the recording medium, is preferably 50% by mass or less.

In the invention, the cross-linking agent can be supplied in a number of ways, such as when forming the ink receiving layer, the above cross-linking agents can be added to the ink receiving layer coating liquid and/or a coating liquid which is used for forming a layer adjacent and contacting the ink receiving layer. Or a coating liquid which includes the cross-linking agent can be applied in advance onto the support body and the ink receiving layer coating liquid can be coated. Or, a solution of the cross-linking agent can be over-coated onto a coating of an ink receiving layer coating liquid after it has dried. From the perspective of manufacturing efficiency, it is preferable that the cross-linking agent is added to the ink receiving layer coating liquid or a coating liquid for forming an adjacent contacting layer, and the cross-linking agent is supplied at the same time as forming the ink receiving layer. In particular, from the perspective of raising the print image density and glossiness of images, it is preferable to include the cross-linking agent in the coating liquid for the ink receiving layer. It is preferable that the concentration of the cross-linking agent in the ink receiving liquid coating layer is between 0.05 and 10% by mass, and more preferable between 0.1 and 7% by mass.

The cross-linking agent, for example the boron compound, is preferably added as follows. Here an example will be described where a boron compound is used. When the ink receiving layer is formed through curing by causing cross-linking of the coating layer by applying an coating solution (coating solution 1) for the ink receiving layer, the layer is cured by cross-linking by applying a basic solution (coating solution 2) having a pH value of 8 or more on the coating layer, either (1) at the same time for forming the coating layer by applying coating solution 1; or (2) during the drying step of the coating layer formed by applying coating solution 1 and also before the coating layer exhibits a decrease in the rate of drying. The boron compound acting as the cross-linking agent may be contained in either coating solution 1 or coating solution 2, or alternatively may be contained in both the coating solution 1 and coating solution 2.

Ammonium Carbonate

In the ink-receiving layer according to the invention, ammonium carbonate is preferably further contained. When ammonium carbonate is contained in the ink-receiving layer, an ink-receiving layer high in the hardness can be obtained.

A content of the ammonium carbonate is, relative to the water soluble resin, preferably 8% by mass or more, more preferably 9% by mass or more and particularly preferably 11% by mass or more. Furthermore, the upper limit of the content thereof, though not particularly restricted, from viewpoints of the image density, ink absorption and suppression of curl of the recording medium, is preferably 20% by mass or less.

Water Dispersible Cationic Resin

Furthermore, as an ingredient of the ink-receiving layer according to the invention, a water dispersible cationic resin may be contained. As the water dispersible cationic resin, a urethane resin that is a cation-modified self-emulsifiable polymer is preferable and the glass transition temperature thereof is preferably less than 50° C.

The "cation-modified self-emulsifiable polymer" means a polymer compound that can naturally form stable emulsion dispersion in an aqueous dispersion without using an emulsifier or surfactant or with only a slight amount thereof added. Quantitatively, the "cation-modified self-emulsifiable polymer" represents a polymer material that has stable emulsion dispersibility at a concentration of 0.5% by mass or more relative to the aqueous dispersion at room temperature of 25° C. The concentration is preferably 1% by mass or more and more preferably 3% by mass or more.

As the "cation-modified self-emulsifiable polymer" according to the invention, more specifically, for instance, polyaddition or polycondensation polymer compounds having a cationic group such as primary, secondary or tertially amino group or a quarterly ammonium group can be cited.

For the above polymers, vinyl polymerization based polymers can be used, such as polymers obtained by the polymerization of the following vinyl monomers. Examples include: acrylic acid esters and metacrylic acid esters (as substituents for the ester group are alkyl and allyl groups, for example the following groups can be used, methyl, ethyl, n-propyl, isopropyl, n-butyl, sec-butyl, tert-butyl, hexyl, 2-ethylhexyl, tert-octyl, 2-chloroethyl, cyanoethyl, 2-acetoxyethyl, tetrahydrofurfuryl, 5-hydroxypentyl, cyclohexyl, benzyl, hydroxyethyl, 3-methoxybutyl, 2-(2-methoxyethoxy)ethyl, 2,2,2-tetrafuroroethyl, 1H, 1H, 2H, 2H-perfluorodecyl, phenyl, 2,4,4-tetramethyl phenyl, 4-chlorophenyl);

vinyl esters, specifically aliphatic carboxylic acid vinyl esters which may have substituents (for example, vinyl acetate, vinyl propionate, vinylbutyrate, vinyl isobutyrate, vinylcaproate, vinylchloroacetate), aromatic carboxylic acid esters which may have substituents (for example benzoic acid vinyl, 4-methyl benzoic acid vinyl, salicylic acid);

acrylic amides specifically acrylic amides, N-mono substituted acrylic amides, N-di substituted acrylic amides (for substituents there are substitutable groups such as alkyl, aryl, and silyl—for example methyl, n-propyl, isopropyl, n-butyl, tert-butyl, tert-octyl, cyclohexyl, benzyl, hydroxy methyl, alkoxy methyl, phenyl, 2,4,5-tetramethyl phenyl, 4-chlorophenyl, trimethyl silyl groups);

methacrylic amides, specifically methacrylic amides, N-mono substituted methacrylic amides, N-di substituted methacrylic amides (for substituents there are substitutable groups such as alkyl, aryl, and silyl—for example methyl, n-propyl, isopropyl, n-butyl, tert-butyl, tert-octyl, cyclohexyl, benzyl, hydroxy methyl, alkoxy methyl, phenyl, 2,4,5-tetramethyl phenyl, 4-chlorophenyl, trimethyl silyl groups);

olefins (for example ethylene, propylene, 1-pentene, vinyl chloride, vinylidene chloride, isoprene, chloroprene, butadiene), styrenes (for example styrene, methylstyrene, isopropylstyrene, methoxystyrene, acetoxystyrene, and chlorostyrene), vinyl ethers (for example methyl vinyl ether, butyl vinyl ether, hexyl vinyl ether, and methoxyethyl vinyl ether).

As the other vinyl monomer, examples include listed crotonate esters, itaconate esters, maleate diesters, fumarate diesters, methyl vinyl ketone, phenyl vinyl ketone, methoxyethyl vinyl ketone, N-vinyloxazolidone, N-vinylpyrrolidone, methylenemalonnitrile, diphenyl-2-acryloyloxyethyl phosphate, diphenyl-2-methacryloyloxyethyl phosphate, dibutyl-2-acryloyloxyethyl phosphate, dioctyl-2-methacryloyloxyethyl phosphate and the like.

As the above-mentioned monomer having a cationic group, there are, for example, monomers having a tertiary amino group, such as dialkylaminoethyl methacrylates, dialkylaminoethyl acrylates and the like.

As polyurethanes applicable to the cationic-group-containing polymer, there are, for example, polyurethanes synthesized by the addition polymerization reaction of various combinations of the diol compounds with the diisocyanate compounds listed below.

Examples of the above-mentioned diol compound include ethylene glycol, 1,2-propanediol, 1,3-propanediol, 1,2-butanediol, 1,3-butanediol, 2,3-butanediol, 2,2-dimethyl-1,3-propanediol, 1,2-pentanediol, 1,4-pentanediol, 1,5-pentanediol, 2,4-pentanediol, 3,3-dimethyl-1,2-butanediol, 2-ethyl-2-methyl-1,3-propanediol, 1,2-hexanediol, 1,5-hexanediol, 1,6-hexanediol, 2,5-hexanediol, 2-methyl-2,4-pentanediol, 2,2-diethyl-1,3-propanediol, 2,4-dimethyl-2,4-pentanediol, 1,7-heptanediol, 2-methyl-2-propyl-1,3-propanediol, 2,5-dimethyl-2-hexanediol, 2-ethyl-1,3-hexanediol, 1,2-octanediol, 1,8-octanediol, 2,2,4-trimethyl-1,3-pentanediol, 1,4-cyclohexanedimethanol, hydroquinone, diethylene glycol, triethylene glycol, dipropylene glycol, tripropylene glycol, polyethylene glycols (average molecular weight=200, 300, 400, 600, 1000, 1500, 4000), polypropylene glycols (average molecular weight=200, 400, 1000), polyester polyols, 4,4'-dihydroxy-diphenyl-2,2-propane, 4,4'-dihydroxyphenylsulfonic acid, and the like.

As the above-mentioned diisocyanate compound, examples include methylene diisocyanate, ethylene diisocyanate, isophorone diisocyanate, hexamethylene diisocyanate, 1,4-cyclohexane diisocyanate, 2,4-toluene diisocyanate, 2,6-toluene diisocyanate, 1,3-xylylene diisocyanate, 1,5-naphthalene diisocyanate, m-phenylene diisocyanate, p-phenylene diisocyanate, 3,3'-dimethyl-4,4'-diphenylmethane diisocyanate, 3,3'-dimethylbiphenylene diisocyanate, 4,4'-biphenylene diisocyanate, dicyclohexylmethane diisocyanate, methylene bis(4-cyclohexyl isocyanate), and the like.

As the cationic group contained in the cationic group-containing polyurethane, there are cationic groups such as primary, secondary and tertiary amines and quaternary ammonium salts. In the self-emulsifying polymer of the invention, it is preferable to use a urethane resin with cationic groups such as tertiary amines or quaternary ammonium salts. The cationic group-containing polyurethanes can be obtained, for example, by introducing cationic groups such as the above diols at the time of synthesizing the polyurethane. Also, in the case of quaternary ammonium salts, polyurethanes containing tertiary amino groups can be quaternized with a quaternizing agent.

The diol compounds and diisocyanate compounds usable for synthesizing the polyurethane may be used each alone, or may be used in combinations of two or more in various proportions decided depending on the purpose (for example, control of the polymer glass transition temperature (Tg), improving solubility, providing compatibility with a binder, and improving stability of a dispersion).

Mordant

In the ink-receiving layer according to the invention, preferably, with an intention of further improving the bleeding over time resistance and water resistance, a mordant such as shown below is added. As the mordant, organic mordants such as cationic polymers (cationic mordants) and inorganic mordants such as water soluble metal compounds are preferable. As the cationic mordant, polymer mordants having, as a cationic functional group, a primary, secondary or tertially amino group or a quarterly ammonium salt group can be preferably used. A cationic non-polymer mordant can be used as well.

As the polymer mordant, homopolymers of monomers (mordant monomers) having a primary, secondary or tertially amino group and salts thereof or a quarterly ammonium salt group, and copolymers or polycondensation products between the mordant monomer and other monomer (non-mordant monomer) can be preferably used. Furthermore, the polymer mordants can be used in either form of a water soluble polymer or aqueous dispersion latex particles.

Examples of the above mordant monomer include trimethyl-p-vinylbenzylammonium chloride, trimethyl-m-vinylbenzylammonium chloride, triethyl-p-vinylbenzyl ammonium chloride, triethyl-m-vinylbenzylammonium chloride, N,N-dimethyl-N-ethyl-N-p-vinylbenzylammonium chloride, N,N-diethyl-N-methyl-N-p-vinylbenzylammonium chloride, N,N-dimethyl-N-n-propyl-N-p-vinylbenzylammonium chloride, N,N-dimethyl-N-n-octyl-N-p-vinylbenzylammonium chloride, N,N-dimethyl-N-benzyl-N-p-vinyl benzyl ammonium chloride, N,N-diethyl-N-benzyl-N-p-vinylbenzylammonium chloride, N,N-dimethyl-N-(4-methyl) benzyl-N-p-vinylbenzylammonium chloride, N,N-dimethyl-N-phenyl-N-p-vinylbenzylammonium chloride, trimethyl-p-vinylbenzylammonium bromide, trimethyl-m-vinylbenzylammonium bromide, trimethyl-p-vinylbenzylammonium sulfonate, trimethyl-m-vinylbenzylammonium sulfonate, trimethyl-p-vinylbenzylammonium acetate, trimethyl-m-vinylbenzyl ammonium acetate, N,N,N-triethyl-N-2-(4-vinylphenyl) ethylammonium chloride, N,N,N-triethyl-N-2-(3-vinylphenyl)ethylammonium chloride, N,N-diethyl-N-methyl-N-2-(4-vinylphenyl)ethylammonium chloride, N,N-diethyl-N-methyl-N-2-(4-vinylphenyl)ethylammonium acetate; quaternary compounds obtained by reacting methyl chlorides, ethyl chlorides, methyl bromides, ethyl bromides, methyl iodides, or ethyl iodides of N,N-dimethylaminoethyl (meth)acrylate, N,N-diethylaminoethyl (meth)acrylate, N,N-dimethylaminopropyl (meth)acrylate, N,N-diethylaminopropyl (meth)acrylate, N,N-dimethylaminoethyl (meth) acrylamide, N,N-diethylaminoethyl (meth)acrylamide, N,N-dimethylaminopropyl (meth) acrylamide, or N,N-diethylaminopropyl (meth)acrylamide; and sulfonates, alkyl sulfonates, acetates, or alkyl carboxylates derived from the quaternary compounds by replacement of the anion.

Specific examples of such compounds include monomethyldiallylammonium chloride, trimethyl-2-(methacryloyloxy) ethylammonium chloride, triethyl-2-(methacryloyloxy)ethylammonium chloride, trimethyl-2-(acryloyloxy) ethylammonium chloride, triethyl-2-(acryloyloxy) ethylammonium chloride, trimethyl-3-(methacryloyloxy) propylammonium chloride, triethyl-3-(methacryloyloxy) propylammonium chloride, trimethyl-2-(methacryloylamino)ethylammonium chloride, triethyl-2-(methacryloylamino) ethylammonium chloride, trimethyl-2-(acryloylamino) ethylammonium chloride, triethyl-2-(acryloylamino)ethylammonium chloride, trimethyl-3-(methacryloylamino) propylammonium chloride, triethyl-3-(methacryloylamino)propylammonium chloride, trimethyl-3-(acryloylamino) propylammonium chloride, triethyl-3-(acryloylamino) propylammonium chloride, N,N-dimethyl-N-ethyl-2-(methacryloyloxy)ethylammonium chloride, N,N-diethyl-N-methyl-2-(methacryloyloxy)ethylammonium chloride, N,N-dimethyl-N-ethyl-3-(acryloylamino) propylammonium chloride, trimethyl-2-(methacryloyloxy) ethyl ammonium bromide, trimethyl-3-(acryloylamino) propylammonium bromide, trimethyl-2-(methacryloyloxy) ethylammonium sulfonate, and trimethyl-3-(acryloylamino) propylammonium acetate.

Examples of other copolymerizable monomers include N-vinylimidazole and N-vinyl-2-methylimidazole. Further, by using a polymerization unit such as N-vinylacetamide, N-vinylformamide, then forming a vinylamine unit by hydrolysis after the polymerization, and a salt thereof also can be used.

The term "a non-mordant monomer" refers to a monomer that does not have a basic or cationic moiety, such as a primary, secondary or tertiary amino group, a salt thereof, or a quaternary ammonium base, and exhibits no or substantially little interaction with dye in inkjet ink.

Examples of non-mordant monomers include alkyl ester (meth)acrylates; cycloalkyl ester (meth)acrylates such as cyclohexyl (meth)acrylate; aryl ester (meth)acrylates such as phenyl (meth)acrylate; aralkyl ester such as benzyl (meth) acrylate; aromatic vinyl compounds such as styrene, vinyltoluene and α-methylstyrene; vinyl esters such as vinyl acetate, vinyl propionate and vinyl versatate; allyl esters such as allyl acetate; halogen-containing monomers such as vinylidene chloride and vinyl chloride; vinyl cyanides such as (meth)acrylonitrile; and olefins such as ethylene and propylene.

The above alkyl ester (meth)acrylates preferably have 1 to 18 carbon atoms in the alkyl moiety. Examples of such alkyl ester (meth)acrylates include methyl (meth)acrylate, ethyl (meth)acrylate, propyl (meth)acrylate, isopropyl (meth)acrylate, n-butyl (meth)acrylate, isobutyl (meth)acrylate, tert-butyl (meth)acrylate, hexyl (meth)acrylate, octyl (meth)acrylate, 2-ethylhexyl (meth)acrylate, lauryl (meth)acrylate, and stearyl (meth)acrylate.

Particularly preferred are methyl acrylate, ethyl acrylate, methyl methacrylate, ethyl methacrylate, and hydroxyethyl methacrylate.

One kind of non-mordant monomer may be used alone or two or more kinds of non-mordant monomers may be used in combination.

Furthermore, as the polymer mordant, polydiallyldimethylammonium chloride, polymethacryloyloxyethyl-β-hydroxyethyldimethylammonium chloride, polyethyleneimine, polyamide-polyamine resins, cationic starch, dicyandiamide formaline condensates, dimethyl-2-hydroxypropylammonium salt polymers, polyamidine, polyvinylamine, dicyan-based cationic resins represented by dicyandiamide-formaline polycondensates, polyamine-based cationic resins represented by dicyanamide-diethylenetriamine polycondensates, epichlorohydrin-dimethylamine addition polymers, dimethyldiallylammonium chloride-$SO_2$ copolymers and diallylamine salt-$SO_2$ copolymers can be preferably cited.

Specific examples of the polymer mordant include those described in JP-A Nos. 48-28325, 54-74430, 54-124726, 55-22766, 55-142339, 60-23850, 60-23851, 60-23852, 60-23853, 60-57836, 60-60643, 60-118834, 60-122940, 60-122941, 60-122942, 60-235134 and 1-161236; U.S. Pat. Nos. 2,484,430, 2,548,564, 3,148,061, 3,309,690, 4,115,124, 4,124,386, 4,193,800, 4,273,853, 4,282,305, and 4,450,224; JP-A Nos. 1-161236, 10-81064, 10-119423, 10-157277, 10-217601, 11-348409, 2001-138621, 2000-43401, 2000-211235, 2000-309157, 2001-96897, 2001-138627, 11-91242, 8-2087, 8-2090, 8-2091, 8-2093, 8-174992, 11-192777, and 2001-301314.

As the inorganic mordant, other than the above, polyvalent water soluble metal salts and hydrophobic metal salt compounds can be cited. Specific examples of the inorganic mordants include salts and complexes of a metal selected from magnesium, aluminum, calcium, scandium, titanium, vanadium, manganese, iron, nickel, copper, zinc, gallium, germanium, strontium, yttrium, zirconium, molybdenum, indium, barium, lanthanum, cerium, praseodymium, neodymium, samarium, europium, gadolinium, dysprosium, erbium, ytterbium, hafnium, tungsten, and bismuth.

Specific examples thereof include calcium acetate, calcium chloride, calcium formate, calcium sulfate, barium acetate, barium sulfate, barium phosphate, manganese chloride, manganese acetate, manganese formate dihydrate, manganese ammonium sulfate hexahydrate, cupric chloride, ammonium copper (II) chloride dihydrate, copper sulfate, cobalt chloride, cobalt thiocyanate, cobalt sulfate, nickel sulfate hexahydrate, nickel chloride hexahydrate, nickel acetate tetrahydrate, nickel ammonium sulfate hexahydrate, nickel amidosulfate tetrahydrate, aluminum sulfate, aluminum alum, basic polyaluminum hydroxide, aluminum sulfite, aluminum thiosulfate, polyaluminum chloride, aluminum nitrate nonahydrate, aluminum chloride hexahydrate, ferrous bromide, ferrous chloride, ferric chloride, ferrous sulfate, ferric sulfate, zinc phenolsulfonate, zinc bromide, zinc chloride, zinc nitrate hexahydrate, zinc sulfate, titanium tetrachloride, tetraisopropyl titanate, titanium acetylacetonate, titanium lactate, zirconium acetylacetonate, zirconyl acetate, zirconyl sulfate, zirconium ammonium carbonate, zirconyl stearate, zirconyl octanoate, zirconyl nitrate, zirconium oxychloride, zirconium hydroxychloride, chromium acetate, chromium sulfate, magnesium sulfate, magnesium chloride hexahydrate, magnesium citrate nonahydrate, sodium phosphotungstate, sodium tungsten citrate, undecatungstophosphoric acid n-hydrate, undecatungstosilicic acid 26-hydrate, molybdenum chloride, undecamolybdophosphoric acid n-hydrate, potassium nitrate, manganese acetate, germanium nitrate, strontium nitrate, yttrium acetate, yttrium chloride, yttrium nitrate, indium nitrate, lanthanum nitrate, lanthanum chloride, lanthanum acetate, lanthanum benzoate, cerium chloride, cerium sulfate, cerium octylate, praseodymium nitrate, neodymium nitrate, samarium nitrate, europium nitrate, gadolinium nitrate, dysprosium nitrate, erbium nitrate, ytterbium nitrate, hafnium chloride and bismuth nitrate. Among these, aluminum-containing compounds, titanium-containing compounds, zirconium-containing compounds and compounds of metals of periodic table IIIB group (salts or complexes) are preferable.

Furthermore, the "polyvalent metal compounds" cited in the section of the (cross-linking agent) as well can be preferably used as the mordant.

An amount of the mordant added to the ink-receiving layer is preferably in the range of 0.01 to 5 g/m$^2$.

(Other Components)

In addition, the ink receiving layer of this invention is constructed to contain the following components if necessary.

To restrain the deterioration of the ink colorant, anti-fading agents such as various ultraviolet absorbers, antioxidants and singlet oxygen quenchers may be contained.

Examples of the ultraviolet absorbers include cinnamic acid derivatives, benzophenone derivative and benzotriazolyl phenol derivatives. Specific examples include (α-cyano-phenylcinnamic acid butyl, o-benzotriazole phenol, o-benzotriazole-p-chlorophenol, o-benzotriazole-2,4-di-t-butyl phenol, o-benzotriazole-2,4-di-t-octyl phenol. A hindered phenol compound can be also used as an ultraviolet absorber, and phenols in which at least one or more of the second place and/or the sixth place is substituted by a branching alkyl group is preferable.

A benzotriazole based ultraviolet absorber, a salicylic acid based ultraviolet absorber, a cyano acrylate based ultraviolet absorber, and oxalic acid anilide based ultraviolet absorber or the like can be also used. For instance, the ultraviolet absorbers as described in JP-A Nos. 47-10537, 58-111942, 58-212844, 59-19945, 59-46646, 59-109055 and 63-53544, Japanese Patent Application (JP-B) Nos. 36-10466, 42-26187, 48-30492, 48-31255, 48-41572 and 48-54965, 50-10726, U.S. Pat. Nos. 2,719,086, 3,707,375, 3,754,919 and 4,220,711 or the like.

A fluorescent whitening agent can be also used as an ultraviolet absorber, and specific examples include a coumalin based fluorescent whitening agent. Specific examples are described in JP-B Nos. 45-4699 and 54-5324 or the like.

Examples of the antioxidants are described in EP 223739, 309401, 309402, 310551, 310552 and 459-416, D.E. Patent No. 3435443, JP-A Nos. 54-48535, 60-107384, 60-107383, 60-125470, 60-125471, 60-125472, 60-287485, 60-287486, 60-287487, 60-287488, 61-160287, 61-185483, 61-211079, 62-146678, 62-146680, 62-146679, 62-282885, 62-262047, 63-051174, 63-89877, 63-88380, 66-88381, 63-113536, 63-163351, 63-203372, 63-224989, 63-251282, 63-267594, 63-182484, 1-239282, 2-262654, 2-71262, 3-121449, 4-291685, 4-291684, 5-61166, 5-119449, 5-188687, 5-188686, 5-110490, 5-1108437 and 5-170361, JP-B Nos. 48-43295 and 48-33212, U.S. Pat. Nos. 4,814,262 and 4,980,275.

Specific examples of the antioxidants include 6-ethoxy-1-phenyl-2,2,4-trimethyl-1,2-dihydroquinoline, 6-ethoxy-1-octyl-2,2,4-trimethyl-1,2-dihydroquinoline, 6-ethoxy-1-phenyl-2,2,4-trimethyl-1,2,3,4-tetrahydroquinoline, 6-ethoxy-1-octyl-2,2,4-trimethyl-1,2,3,4-tetrahydroquinoline, nickel cyclohexanoate, 2,2-bis(4-hydroxyphenyl) propane, 1,1-bis(4-hydroxyphenyl)-2-ethylhexane, 2-methyl-4-methoxy-diphenylamine, 1-methyl-2-phenyl indole.

These anti-fading agents can be used singly or in combinations of two or more. The anti-fading agents can be dissolved in water, dispersed, emulsified, or they can be included within microcapsules. The amount of the anti-fading agents added is preferably 0.01 to 10% by mass, relative to the total ink receiving layer coating liquid.

In the invention, in order to prevent curl, it is preferable to include organic solvents with a high boiling point in the ink receiving layer.

For the above high boiling point organic solvents water soluble ones are preferable. As water soluble organic solvents with high boiling points the following alcohols are examples: ethylene glycol, propylene glycol, diethylene glycol, triethylene glycol, glycerin, diethylene glycol monobutylether (DEGMBE), triethylene glycol monobutyl ether, glycerin monomethyl ether, 1,2,3-butane triol, 1,2,4-butane triol, 1,2,4-pentane triol, 1,2,6-hexane triol, thiodiglycol, triethanolamine, polyethylene glycol (average molecular weight of less than 400). Diethylene glycol monobutylether (DEGMBE) is preferable.

The amount of the above high boiling point organic solvents used in the coating liquid for the ink receiving layer is preferably 0.05 to 1% by mass, and particularly favorable is 0.1 to 0.6% by mass. The ink-receiving layer may contain a various inorganic salts and acids and alkalis as a pH controlling agent.

Furthermore, in the viewpoint of suppressing frictional electrification and peeling electrification of the ink-receiving layer, metal oxide particles may be contained in the ink-receiving layer. And in the viewpoint of reducing a frictional property of the surface, a various matt agent may be contained in the ink-receiving layer.

Support

As the support that is used in the invention, any one of a transparent support made of a transparent material such as plastics and a non-transparent support made of a non-transparent material such as paper can be used. However, as the outermost layer on a side where an ink-receiving layer is disposed, a resin layer made including a thermoplastic resin such as polyethylene (hereinafter, in some cases, simply referred to as "thermoplastic resin-containing layer") is preferably disposed. Thermoplastic resin-containing layer can be disposed as needs arise on both sides of a paper base material.

Thermoplastic Resin-containing Layer

In thermoplastic resin-containing layer, from the viewpoint of controlling the center surface average roughness (SRa) of the ink-receiving layer disposed thereon, the center surface average roughness (SRa) of a surface on a side where the ink-receiving layer is disposed is preferably 0.15 μm or less when measured under the condition of the cutoff of 0.02 to 0.5 mm, and 0.45 μm or less when measured under the condition of the cutoff of 1 to 3 mm. Furthermore, a value of the center surface average roughness (SRa value) of thermoplastic resin-containing layer is more preferably 0.13 μm or less when measured under the condition of the cutoff of 0.02 to 0.5 mm, and 0.4 μm or less when measured under the condition of the cutoff of 1 to 3 mm, and, particularly preferably 0.1 μm or less when measured under the condition of the cutoff of 0.02 to 0.5 mm, and 0.35 μm or less when measured under the condition of the cutoff of 1 to 3 mm.

The center surface average roughness (SRa) of thermoplastic resin-containing layer can be controlled, other than by applying a calender process after the formation of a thermoplastic resin-containing layer, by applying a calender process to base paper and support, or by making a layer thickness of thermoplastic resin-containing layer itself thicker.

For reference's sake, the thickness of thermoplastic resin-containing layer is, from the viewpoint of obtaining excellent smoothness, preferably 30 µm or more, more preferably 35 µm or more and particularly preferably 40 µm or more.

A method of measuring the center surface average roughness (SRa) is the same as that in the ink-receiving layer.

In the next place, thermoplastic resin will be described.

Thermoplastic resin is not restricted to particular one and one obtained by microparticulating a known thermoplastic resin such as a polyolefin resin (for instance, a homopolymer of $\alpha$-olefin such as polyethylene or polypropylene or a mixture thereof) or a latex thereof can be appropriately selected to use. Among these, as thermoplastic resin, a polyolefin resin is preferable (particularly, polyethylene resin).

The polyolefin resin, as far as it can be extrusion-coated, is not restricted in the molecular weight thereof, and the molecular weight can be appropriately selected according to the object. Normally, a polyolefin resin having a molecular weight in the range of 20,000 to 200,000 is used.

As the polyethylene resin, there is no particular restriction. It can be appropriately selected depending on the object. For instance, high-density polyethylene (HDPE), low-density polyethylene (LDPE) and linear low-density polyethylene (L-LDPE) can be cited.

In thermoplastic resin-containing layer, a white pigment, a colored pigment or a fluorescent whitening agent, or stabilizers such as phenol, bisphenol, thiobisphenol, amines, benzophenone, salicylate, benzotriazole and organometallic compounds can be preferably added.

As a method of forming thermoplastic resin-containing layer, melt-extrusion, wet-lamination and dry lamination methods can be cited, and the melt-extrusion method is the most preferable one. When a thermoplastic resin-containing layer is formed by means of the melt extrusion, in order to strengthen the adhesion between a thermoplastic resin-containing layer and a lower layer thereof (hereinafter, referred to as coated layer), a surface of the coated layer is preferably pre-treated.

As the pre-treatment, acid etching with a sulfuric acid-chromic acid mixture, flame processing with a gas flame, UV-irradiation treatment, corona discharge treatment, glow discharge treatment and anchor coating of alkyl titanate can be cited, and an appropriate one can be selected therefrom to use. In particular, from the viewpoint of conveniences, the corona discharge treatment is preferable. When the corona discharge treatment is applied, the pre-treatment is necessarily applied so that a contact angle with water may be 70° or less.

Paper Base

In the support in the invention, a paper base material that is a non-transparent support can be used.

The paper base material may be a natural pulp paper containing a common natural pulp as a main component; a mixed paper containing a natural pulp and a synthetic fiber; a synthetic fiber paper containing a synthetic fiber as a main component; or a simulated paper, which is produced from a synthetic resin film of such as polystyrene, polyethylene terephthalate or polypropylene. Natural pulp papers (hereinafter, referred to simply as the "base paper") are particularly preferable. The base paper may be a neutral paper (pH: 5 to 9) or an acidic paper, but is preferably a neutral paper.

As the base paper, one which has as the primary raw material natural pulp selected from conifers and broadleaf trees and to which, as needs arise, a loading material such as clay, talc, calcium carbonate, or urea resin particles; a sizing agent such as rosin, an alkyl ketene dimer, a higher fatty acid, epoxidized fatty acid amide, paraffin wax, or alkenyl succinic acid; a paper strength intensifying agent such as starch, polyamide polyamine epichlorohydrin, or polyacrylamide; and a bonding agent such as aluminum sulfate or a cationic polymer are added can be used. Furthermore, a softening agent such as a surfactant may be added thereto. Still furthermore, synthetic paper that uses synthetic pulp instead of the natural pulp may be used, or a mixture of natural pulp and synthetic pulp in an arbitrary ratio may be used. Of these, broad leaf tree pulp of short fiber and high evenness is preferably used. The hydrature of pulp material to be used is preferably in the range of 200 to 500 ml (C.S.F.), and more preferably in the range of 300 to 400 ml.

The paper base material may contain other ingredients such as a sizing agent, softening agent, paper strength additive, and bonding agent. The sizing agents include rosins, paraffin waxes, higher aliphatic acid salts, alkenyl succinate, aliphatic acid anhydrides, styrene-maleic anhydride copolymers, alkylketene dimers and epoxidized aliphatic acid amides. The softening agents include reaction products from maleic anhydride copolymers and polyalkylene polyamines and higher aliphatic acid quaternary ammonium salts. The paper strength additives include polyacrylamide, starch, polyvinyl alcohol, melamine-formaldehyde condensates and gelatin. The fixing agents include aluminum sulfate and polyamide polyamine epichlorohydrins. Additionally, as needs arise, a dye, fluorescence dye or anti-static agent may be added.

The aforementioned paper base material is preferably subjected, prior to the formation of thermoplastic resin-containing layer, to an activation treatment such as corona discharge treatment, flame treatment, glow discharge treatment or plasma treatment.

Calender Process

The support according to the invention can be subjected to the calender process.

When after a thermoplastic resin-containing layer is disposed on the paper base material a calender process is applied under specific conditions, the planarity of thermoplastic resin-containing layer can be obtained, and high glossiness, high planarity and high quality image forming property of a surface of an ink-receiving layer formed through thermoplastic resin-containing layer can be secured.

The calender process is preferably applied in such a manner that, with a soft calender or super calender at least one of a pair of rolls of which is constituted of a metal roll (preferably constituted of a metal roll and a resin roll) or both thereof, a surface temperature of the metal roll is set to a temperature equal to or higher than the glass transition temperature of thermoplastic resin and the nip pressure between a roll nip of the pair of rolls is set to 50 to 400 kg/cm.

In what follows, a soft calendar and a super calendar, both having a metal roll and a resin roll, will be detailed. The metal roll, as long as it is a cylindrical or columnar roll having an even surface and has a heating unit inside thereof, is not particularly restricted in a material, that is, a known metal roll can be appropriately selected to use. Furthermore, the metal roll is preferably as smooth as possible in the surface roughness since the metal roll comes into contact with a recording surface side of surfaces on both sides of the support in the calendar treatment, that is, a surface on a side where the ink receiving layer described below is formed. The surface roughness is specifically preferably 0.3 s or less in terms of the surface roughness stipulated by JIS B0601, and more preferably 0.2 s or less.

Furthermore, a surface temperature of the metal roll during the treatment is generally preferably in the range of 70 to 250° C. when the paper base material is treated. On the other hand, when the paper base material on which thermoplastic resin layer is coated is treated, the surface temperature is preferably equal to or higher than the glass transition temperature Tg of thermoplastic resin contained in thermoplastic resin-containing layer, and more preferably the Tg or higher and Tg+40° C. or lower.

The resin roll may be appropriately selected from a synthetic resin roll made of a polyurethane resin or a polyamide resin, and the shore D hardness is suitably from 60 to 90.

The nip pressure of the pair of rolls having the metal roll is appropriately from 50 to 400 kg/cm, and preferably from 100 to 300 kg/cm. The treatment is desirably carried out substantially once or twice when a soft calender and/or super calender that is provided with a pair of rolls that are constituted as described above is used.

A support used for an ink jet recording medium of the invention is not particularly restricted; that is, a transparent support made of a transparent material such as plastics can be used as well. As a material capable of using in the transparent support, a material that is transparent and has the nature capable of withstanding radiation heat when used in OHP and backlight display is preferable. As such a material, for instance, polyesters such as polyethylene terephthalate (PET), polysulfone, polyphenylene oxide, polyimide, polycarbonate and polyamide can be cited. Among these, polyesters are preferable; in particular, polyethylene terephthalate is preferable.

Furthermore, with a read only optical disk such as CD-ROM or DVD-ROM, a write once optical disk such as CD-R or DVD-R or a rewritable optical disk as a support, an ink receiving layer and a gloss imparting layer can be imparted as well on a the label surface side.

Manufacturing Method of Inkjet Recording Medium

Ink-receiving layers of the first and second ink-jet recording media of the invention can be suitably formed in such a manner that an ink-receiving layer forming coating solution (coating solution A) containing a water soluble resin, particles and a cross-linking agent is coated on a surface of the support, for instance; a basic solution (solution B) having the pH of 8 or more is imparted on the coated layer at a timing of either (1) simultaneously with the formation of the coated layer by coating or (2) during drying of the coated layer formed by coating and before the coated layer exhibits a falling-rate of drying; and, thereafter, the coated layer is crosslinked and cured (Wet-on-Wet method (WOW method)). Now, the cross-linking agent that crosslinks the water soluble resin is added to at least one of the coating solutions A and B.

In the case of the WOW method being used with a mordant added in the solution B, the mordant is present much in the vicinity of a surface of the ink-receiving layer. Accordingly, since ink-recording ink, in particular, a dye can be sufficiently mordanted, preferably, a high-density image can be formed and the water resistance of printed letters and images after printing can be improved. The mordant may be partially contained in the coating solution A, and, in that case, mordants that are used in the coating solutions A and B may be the same or different from each other. Furthermore, since the porous ink-receiving layer obtained as mentioned above can rapidly absorb the ink owing to the capillary phenomena, the ink bleeding is not caused and a dot excellent in the circularity can be formed.

For instance, an ink-receiving layer coating solution that contains at least a water soluble resin (for instance, PVA), particles (for instance, vapor-phase-process silica) and a cross-linking agent (for instance, boron compound) can be prepared in such a manner that vapor-phase-process silica and an aqueous solution of PVA (for instance, the PVA may be substantially 15% by mass of the vapor-phase-process silica) and a boron compound are added and these are dispersed by use of a high-pressure disperser (for instance, trade name: Altimizer, manufactured by Sugino Machine Ltd.) under the conditions of a high-speed rotation under pressure of 130 mPa. When the pressure condition is more detailed, from the viewpoint of the processing capacity, 50 mPa or more is preferable, 100 mPa or more is more preferable and 130 mPa or more is particularly preferable. Furthermore, the upper limit is not particularly restricted; however, from the viewpoint of the durability of the unit, 350 mPa or less is preferable.

The obtained coating solution is in a homogeneous sol state. When this is coated on a support by use of a coating method described below and dried, a porous ink-receiving layer can be formed.

When the ink-receiving layer forming coating solution is microparticulated with a disperser, an aqueous dispersion having an average particle diameter in the range of 10 to 120 nm can be obtained. As the disperser used to obtain the aqueous dispersion, so far known various dispersers can be used. From the viewpoint of efficiently dispersing lumpy particles, a medium stirring disperser, a colloid mill disperser or a high-pressure disperser is preferably used, and, from the viewpoint of improving the flatness, the high-pressure disperser is particularly preferable.

Water, organic solvents and mixed solvents thereof may be used as the solvent in each step. Examples of the organic solvent used for preparing a coating solution include alcohols such as methanol, ethanol, n-propanol, i-propanol and methoxypropanol, ketones such as acetone and methylethyl ketone, tetrahydrofuran, acetonitrile, ethyl acetate and toluene.

In the invention, as a coating method of the coating solution, without restricting to particular one, known coating methods can be used. For instance, a known coating method utilizing an extrusion die coater, air doctor coater, bread coater, rod coater, knife coater, squeeze coater, reverse roll coater or bar coater can be used.

The basic solution of which pH is 8 or more (solution B) can be coated after the ink-receiving layer coating solution (coating solution A) has been coated. However, it may be coated before the coated layer shows the decreasing rate drying. That is, after the coating solution A has been coated, during the coated layer shows the constant rate of drying, the solution B can be preferably introduced to manufacture.

The basic solution (solution B) of which pH is 8 or more, as needs arise, can contain a cross-linking agent and a mordant. The pH of the basic solution is 8 or more, preferably 8.5 or more and more preferably 9.0 or more. When the pH is less than 8, a cross-linking reaction, due to the cross-linking agent, of the aqueous polymer contained in the coating solution A may not be sufficiently carried out and the ink-receiving layer may cause defects such as cracks. The basic solution includes at least a basic substance (for instance, ammonia, primary amines (ethyl amine and polyallylamine), secondary amines (dimethyl amine and trimethyl amine), tertially amines (N-ethyl-N-methylbutyl amine) and hydroxides of alkali metals or alkaline earth metals) and/or a salt of the basic substance.

The mordant coating solution (solution B) can be prepared, for instance, by adding ammonium carbonate (for instance, 1 to 10%) and zirconium ammonium carbonate (for instance, 0.5 to 7%) to ion-exchanged water r, followed by thoroughly stirring. The symbol "%" in each of compositions denotes % by mass of solid content.

Here, the phrase "before the coating layer exhibits a decreasing rate drying" usually means a process during several minutes immediately after the application of the ink-receiving layer coating solution. During this period, a phenomenon of the constant rate of drying, during which the solvent content (dispersing medium) in the coated layer decreases in proportion to the time, is exhibited. The time when a constant rate of drying is exhibited is described in *Chemical Engineering Handbook* (pp. 707-712, published by Maruzen Co., Ltd. in Oct. 25, 1980).

As described above, after the ink-receiving layer coating solution is coated, the coated layer is dried until the coated layer exhibits a decreasing rate drying. The drying is generally performed at a temperature in the range of 40 to 180° C. for a period of 0.5 to 10 minutes (preferably for a period of 0.5 to 5 minutes). The drying time, which naturally varies depending on the applied amount of the solution, is normally suitably within the above-mentioned range.

As a method for coating the solution before the coating layer exhibits a decreasing rate drying, (1) a method of applying the solution B further on the coated layer, (2) a method of spraying the solution with a spray, or (3) a method of immersing a support on which the coated layer is formed into the solution B can be cited.

In the method (1), as a coating method for coating the solution B, known coating methods utilizing a curtain flow coater, an extrusion die coater, an air doctor coater, a bread coater, a rod coater, a knife coater, a squeeze coater, a reverse roll coater or a bar coater and the like can be used. However, the extrusion die coater, the curtain flow coater or the bar coater, which is not brought into direct contact with the already formed coated layer, can be preferably used.

After the basic solution (solution B) is coated, drying and curing are generally carried out at a temperature of 40 to 180° C. and for 5 to 30 min. Among these, heating at a temperature of 40 to 150° C. and for 1 to 20 min is preferable.

Furthermore, the basic solution (solution B) can be coated simultaneously with the coating of the ink-receiving layer coating solution (coating solution A). In such a case, the coating solutions A and B are simultaneously (multi-layer coating) coated on a support with the coating solution A brought into contact with the support, followed by drying and curing, and thereby an ink-receiving layer can be formed.

Coating methods using, for example, an extrusion die coater or a curtain flow coater may be employed for simultaneous application (multilayer coating). When the coated layers are dried after the simultaneous coating, these layers are usually dried by heating at 15 to 150° C. for 0.5 to 10 minutes, and preferably by heating at 40 to 100° C. for 0.5 to 5 minutes.

When the coating solutions are simultaneously applied (multi-layer coating) using, for example, an extrusion die coater, the simultaneously supplied two coating solutions are laminated at near the outlet of the extrusion die coater, or immediately before the solutions are transferred onto the support, and are laminated on the support to make a dual layer. Since the two layers of the coating solutions laminate before application onto the support, they tend to undertake cross-linking at the interface between the two solutions while the solutions are transferred onto the support. This results in the supplied two solutions readily become viscous by being mixed with each other in the vicinity of an outlet of the extrusion die coater, occasionally leading to trouble in the coating operation. Accordingly, it is preferable to simultaneously arrange triple layers by presenting a barrier layer solution (intermediate layer solution) between the solution A and solution B, at the same time as applying of the coating solutions A and B.

The barrier-layer solution can be selected without particularly limitations, and examples thereof include an aqueous solution containing a trace amount of water-soluble resin, water, and the like. The water-soluble resins are used considering the coating property of the solution, for example, for increasing the viscosity of the solution, and examples thereof are polymers including cellulosic resins (e.g., hydroxypropylmethylcellulose, methylcellulose, hydroxyethylmethyl cellulose, and the like), polyvinylpyrrolidone, gelatin, and the like. The barrier-layer solution may also contain a mordant.

In a constituent layer (for instance, an ink-receiving layer) of an inkjet recording medium of the invention, a polymer particle dispersion may be added. The polymer particle dispersion is used to improve the film physicality such as the dimensional stability, curl, adhesion and crack of film. The polymer particle dispersion is described in JP-A Nos. 62-245258, 62-1316648 and 62-110066. When a polymer particle dispersion of which glass transition temperature is low (40° C. or less) is added to an ink-receiving layer, the layer can be inhibited from cracking or curling. Furthermore, when a polymer particle dispersion of which glass transition temperature is high is added to a back layer, the layer can be inhibited from curling as well.

After forming on the support, the ink receiving layer may be subjected to calendering by passing through roll nips under heat and pressure, for example, by using a super calender or gloss calender, or the like, for improvement in the surface smoothness, glossiness, transparency, and strength of the coated film. However, because calendering sometimes causes decrease in void ratio (i.e., decrease in ink absorptive property), it is necessary carry out calendering under conditions set to reduce the decrease in void percentage.

The roll temperature during calendering is preferably 30 to 150° C. more preferably 40 to 100° C., and the linear pressure between rolls during calendering is preferably 50 to 400 kg/cm and more preferably 100 to 200 kg/cm.

Furthermore, when after an ink-receiving layer is formed on a support the support is thermo-treated in an oven, a high-hardness ink-receiving layer can be formed.

A temperature in thermal treatment is preferably 30° C. or more, more preferably 35° C. or more and particularly preferably 40° C. or more. Furthermore, a treatment time can be appropriately determined depending on the temperature, and, the higher the temperature is, the shorter the treatment time is. However, the treatment time is preferably 15 hrs or more, more preferably 20 hrs or more and particularly preferably 25 hrs or more.

In the invention the thickness of the ink receiving layer should be decided, in the case of inkjet recording, according to the void percentage of the layer, as the layer should have a sufficient absorption capacity allowing absorption of all droplets. For example, if the ink quantity is 8 nl/mm$^2$ and the void percentage is 60%, a film having a thickness of about 15 μm or more is required. Considering the above, ink receiving layer for ink jet recording preferably has a thickness of 10 to 50 μm.

In addition, the median diameter of the pores in the ink receiving layer is preferably 0.005 to 0.030 μm, and more preferably 0.01 to 0.025 μm. The void percentage and the pore median size may be determined by using a mercury porosimeter (trade name: "Poresizer 9320-PC2", manufactured by Shimadzu Corporation).

The ink receiving layer is preferably higher in transparency, and the haze value, an indicator of transparency, of the ink receiving layer formed on a transparent film support is preferably 30% or less and more preferably 20% or less. The haze value may be determined by using a hazemeter (trade name: HGM-2DP, manufactured by Suga Test Instrument Co., Ltd.).

The disclosure of Japanese Patent Application No. 2005-29789 is incorporated herein by reference in its entirety.

EXAMPLES

In what follows, the invention will be detailed with reference to examples. However, the invention is not restricted to the examples. In the examples, word "parts" and symbol "%", respectively, mean "parts by mass" and "% by mass".

Example 1

Preparation of Support

A wood pulp made of 100 parts of LBKP was beaten with a double disc-refiner so that the Canadian freeness became 300 mL, followed by adding 0.5 parts of epoxidized behenic amide, 1.0 part of anionic polyacrylamide, 0.1 parts of polyamide polyamine epichlorohydrin and 0.5 parts of cationic polyacrylamide all by absolute dry mass ratio to the pulp. A Fourdrinier paper machine was used to weight the resultant and make base paper having weight of 170 g/m².

In order to adjust a surface size of the base paper, 0.4% of a fluorescent whitening agent (trade name: Whitex BB, manufactured by Sumitomo Chemical Co., Ltd.) was added to a 4% polyvinyl alcohol aqueous solution. This was impregnated in the base paper so as to be 0.5 g/m² in terms of the absolute dry mass, followed by drying, further followed by applying a calender process, and thereby base paper of which density was adjusted to 1.05 g/cc was obtained.

After undertaking corona electrical discharge treatment of the wire surface (back surface) of the paper base, the surface is coated to a thickness of 38 μm with high density polyethylene using a melt extrusion machine, and the resin layer is formed on what was the matt surface (from now on this thermoplastic resin layer surface will be referred to as the 'back surface'). Further corona electrical discharge treatment is carried out on this back surface. Then, as an anti-static agent, aluminum oxide (trade name: Aluminasol 100; manufactured by Nissan Chemical Industries Ltd) and silicon dioxide (trade name: Snowtex 0; manufactured by Nissan Chemical Industries Ltd) at a mass ratio of 1:2 is dispersed in water to form a treatment liquid and coated to a dry weight of 0.2 g/m².

Furthermore, a felt surface (front surface) side that is a side on which a resin layer was not disposed was subjected to corona discharge. Thereafter, low density polyethylene containing 10% of anatase-type titanium dioxide, a slight amount of ultramarine blue, and a 0.01% (with respect to the polyethylene) of fluorescent whitening agent, and having a MFR (melt flow rate) of 3.8 was extruded from a melt-extruder onto the front surface side of the base paper so as to form a highly glossy thermoplastic resin layer having a thickness of 40 μm (Hereinafter, the highly glossy layer is called a front surface.). In this way, a support was produced.

Production of Inkjet Recording Medium

1) Preparation of Ink-receiving Layer Coating Solution A

Of the composition shown below, (1) particles of vapor-phase-process silica, (2) ion-exchanged water, (3) "Sharol DC-902P" and (4) "ZA-30" were mixed, followed by dispersing with a high-pressure disperser Altimizer (manufactured by Sugino Machine Corp.) under the pressure of 130 mPa by one pass, and the dispersion was heated to 45° C. and kept there for 20 hr. Thereafter, to the dispersion, (5) boric acid, (6) a polyvinyl alcohol solution, (7) "Superflex 650" and (8) ethanol were added at 30° C., and thereby an ink-receiving layer coating solution A was prepared.

Composition of Ink Receiving Layer Coating Solution A (1) Particles of vapor-phase-process silica (inorganic particle) (trade name: AEROSIL 300SF75, manufactured by Nippon Aerosil Co., Ltd.) 8.9 parts,
(2) Ion-exchanged water 56.0 parts,
(3) "Sharol DC-902P" (51.5% aqueous solution) (dispersion agent, manufactured by Dai-ichi Kogyo Seiyaku Co., Ltd.) 0.78 parts,
(4) "ZA-30" (trade name, manufactured by Dai-ichi Kogyo Seiyaku Co., Ltd.) 0.48 parts,
(5) Boric acid (cross-linking agent) 0.4 parts,
(6) Polyvinyl alcohol (water soluble resin) solution 31.2 parts,
  <Composition of the Polyvinyl Alcohol Solution>
  PVA235 (trade name, degree of saponification: 88 mol % and degree of polymerization 3500, manufactured by Kuraray Co., Ltd.) 2.17 parts,
  polyoxyethylene lauryl ether (surfactant) (trade name: "Emulgen 109P", 10% aqueous solution, HLB value: 13.6, manufactured by Kao Corporation) 0.07 parts,
  diethylene glycol monobutyl ether (trade name: Butycenol 20P, manufactured by Kyowa Hakko Chemical Co., Ltd.) 0.66 parts and
  ion exchanged water 28.2 parts,
(7) "Superflex 650" (trade name, manufactured by Dai-ichi Kogyo Seiyaku Co., Ltd.) 2.2 parts, and
(8) Ethanol 1.17 parts 2) Preparation of Inkjet Recording Medium After the corona discharge treatment was applied on a front surface of the support, on the front surface of the support, to 210 g/m² of the above-obtained ink-receiving layer coating solution A, a five-times diluted polyaluminum chloride aqueous solution (trade name: Alfine 83, manufactured by Taimei Chemicals Co., Ltd.) was coated so as to be 10.8 g/m² by use of an extrusion die coater (coating step). Thereafter, when the coated layer was dried with a hot air dryer at 80° C. (wind velocity: 3 to 8 m/sec) so that a solid concentration of the coated layer may be 20%, the coated layer exhibited the constant rate of drying during this period. Immediately thereafter, the coated layer was immersed in a mordant solution B having a composition below for 30 sec to adhere 15 g/m² thereon (step of imparting a mordant solution), followed by further drying at 80° C. for 10 min (step of drying). Thereby, an inkjet recording medium (1) according to the invention, which is provided with an ink-receiving layer having a dry thickness of 32 μm was prepared.

| Composition of Mordant Solution B | |
|---|---|
| Boric acid | 0.65 parts, |
| zirconium ammonium carbonate (trade name: Zircosol AC-7, manufactured by Daiichi Kigenso Kagaku Kogyo Co., Ltd) | 2.5 parts, |

-continued

| Composition of Mordant Solution B | |
|---|---|
| ammonium carbonate (1st-grade, manufactured by Kanto Chemical Corp.) | 5.0 parts, |
| ion-exchanged water r | 85.8 parts, |
| polyoxyethylene lauryl ether (surfactant) (trade name: Emulgen 109P (10% aqueous solution), HLB value: 13.6, manufactured by Kao Corporation) | 6.0 parts |

Example 2

Except that in the <Composition of ink receiving layer coating solution A> according to example 1, an amount of added PVA235 was changed from 2.17 parts to 2.34 parts and an amount of added boric acid was changed from 0.4 parts to 0.43 parts, similarly to example 1, an inkjet recording medium (2) according to the invention was prepared.

Example 3

Except that in the <Composition of Mordant solution B> according to example 1, an amount of added ammonium carbonate was changed from 5.0 parts to 10.0 parts and an amount of added ion-exchanged water r was changed from 85.8 parts to 80.8 parts, similarly to example 1, an inkjet recording medium (3) according to the invention was prepared.

Example 4

Except that in the <Composition of Mordant solution B> according to example 1, an amount of added zirconium ammonium carbonate was changed from 2.5 parts to 12.5 parts and an amount of added ion-exchanged water r was changed from 85.8 parts to 75.8 parts, similarly to example 1, an inkjet recording medium (4) according to the invention was prepared.

Example 5

Except that in the <Composition of ink receiving layer coating solution A> according to example 1, an amount of added PVA235 was changed from 2.17 parts to 2.34 parts and in the <Composition of Mordant solution B>, an amount of added boric acid was changed from 0.4 parts to 0.43 parts, an amount of added ammonium carbonate was changed from 5.0 parts to 10.0 parts, an amount of added zirconium ammonium carbonate was changed from 2.5 parts to 12.5 parts and an amount of added ion-exchanged water r was changed from 85.8 parts to 70.8 parts, similarly to example 1, an inkjet recording medium (5) according to the invention was prepared.

Example 6

Except that the inkjet recording medium prepared in example 1 was thermo-treated at 30° C. for 5 days in an oven, similarly to example 1, an inkjet recording medium (6) according to the invention was prepared.

Example 7

Except that in thermal treatment according to example 6, a treatment temperature was changed to 40° C. and a treatment time was changed to 15 hrs, similarly to example 6, an inkjet recording medium (7) according to the invention was prepared.

Comparative Example 1

Except that in the <Composition of ink receiving layer coating solution A> according to example 1, an amount of added PVA235 was changed from 2.17 parts to 1.82 parts and an amount of added boric acid was changed from 0.4 parts to 0.33 parts, similarly to example 1, an inkjet recording medium (8) according to the invention was prepared.

Comparative Example 2

Except that in the <Composition of Mordant solution B> according to example 1, an amount of added ammonium carbonate was changed from 5.0 parts to 1.5 parts and an amount of added ion-exchanged water r was changed from 85.8 parts to 89.3 parts, similarly to example 1, an inkjet recording medium (9) according to the invention was prepared.

Comparative Example 3

Except that in the <Composition of Mordant solution B> according to example 1, an amount of added zirconium ammonium carbonate was changed from 2.5 parts to 0.5 parts and an amount of added ion-exchanged water r was changed from 85.8 parts to 87.8 parts, similarly to example 1, an inkjet recording medium (10) according to the invention was prepared.

Comparative Example 4

Except that in example 1 a thickness of a thermoplastic resin-containing layer on a front surface side of the support was changed to 15 μm, similarly to example 1, an inkjet recording medium (11) according to the invention was prepared.

Evaluation

Hardness

By use of a dynamic ultra micro hardness tester (trade name: DUH-201, manufactured by Shimadzu Corporation), with a weight of 0.5 gf (=4.9 mN) applied on a triangular pyramid stylus of 115° for 5 sec, an indentation depth after removal of the weight was measured. A value of the hardness was obtained according to an equation below.

$$H = 37.838 P/h^2$$

H=dynamic micro hardness

P=test weight (gf) and h=indentation depth after removal of the weight (μm)

Scratch Strength

By use of a scratch strength tester (trade name: HEIDON-18, manufactured by Shinto Kagagu Corp.), by continuously applying a weight of 0 to 100 g on a scratch needle of 0.7 mm R, the scratch strength was obtained according to an equation below.

$$\text{Scratch strength} = 100 - x$$

(x=a distance from a point where a weight of 100 g is applied to a visual limit (mm))

Center Surface Average Roughness (SRa)

The center surface average roughness (SRa) was measured under the condition of cut-off of 0.02 to 0.5 mm with a three-dimensional surface analysis microscope (trade name: Zygo New View 5000, manufactured by Zygo Corp.) based on measurement and analysis conditions below.

[Measurement and Analysis Conditions]

Measured length: 10 mm in X-direction and 10 mm in Y-direction

Object lens: 2.5 times and

Band-pass filter: 0.02 to 0.5 mm

Furthermore, the center surface average roughness (SRa) was measured under the condition of cut-off of 1 to 3 mm with a surface shape analyzer (trade name: Nanometro 110F, manufactured by KURODA Precision Industries Ltd.) based on measurement and analysis conditions below.

[Measurement and Analysis Conditions]

Scanning direction: MD direction of sample

Measured length: 50 mm in X-direction and 30 mm in Y-direction

Measurement pitch: 0.1 mm in X-direction and 1.0 mm in Y-direction

Scanning speed: 20 mm/sec and

Band-pass filter: 1 to 3 mm

Image Clarity

To inkjet recording media (1) through (11) obtained above, a solid black (K) image was printed under image recording conditions below by use of an inkjet printer (trade name: PM-G800, manufactured by Seiko Epson Corporation), and thereby measurements samples were prepared.

(Image Recording Conditions)

Print data: R G B digital values (8 bit): 0, 0, 0

Print setting: Paper kind: EPSON Photo Paper

Color or Non color: color

Mode setting: recommended setting, clear

Drying condition up to measurement of the image clarity: drying for one day under atmospheric conditions of 23° C. and 50% RH In the next place, the image clarity was measured of a black solid image portion of each of the inkjet recording media by use of an image clarity meter (trade name: ICM-1, manufactured by Suga Test Instruments Co., Ltd.) based on an image clarity test method defined in JIS-H8686-2 under the measurement and analysis conditions below.

Measurement method: reflection

Measurement angle: 60°

Optical comb: 2.0 mm

D/I Value

Firstly, similarly to the method described above (image clarity), measurement samples were prepared.

In the next place, based on a D/I value test method defined by the ASTM E430, the D/I value of a black solid image recorded with inkjet recording ink was measured by use of DGM-30 (manufactured by Murakami Color Research Laboratory Co., Ltd.).

Bleeding Over Time

Using an inkjet printer (trade name: Pixus 850i, manufactured by Cannon Inc.), a black lattice-like line pattern (line width: 0.28 mm) was printed on each of the inkjet recording media, followed by measuring magenta density ($OD_0$) by use of X-Rite 310TR (manufactured by X-Rite Inc.). After leaving 3 hrs after the print, the recorded medium was stored for 3 days in a thermo-hygrostat under 35° C. and 80% RH, the magenta density (OD) was once more measured, and the bleeding rate over time was obtained from an equation below.

Bleeding rate over time=$(OD/OD_0) \times 100 (\%)$

Results obtained above are shown in Table 1 below.

TABLE 1

|  |  | Example |  |  |  |  |  |  | Comparative example |  |  |  |
|---|---|---|---|---|---|---|---|---|---|---|---|---|
|  |  | 1 | 2 | 3 | 4 | 5 | 6 | 7 | 1 | 2 | 3 | 4 |
| P/B ratio | | 4.1 | 3.8 | 4.1 | 4.1 | 3.8 | 4.1 | 4.1 | 4.9 | 4.1 | 4.1 | 4.1 |
| Ammonium carbonate (% to PVA235) | | 17 | 17 | 33 | 17 | 33 | 17 | 17 | 17 | 5 | 17 | 17 |
| Zirconium ammonium carbonate (% to PVA235) | | 2.40 | 2.40 | 2.40 | 12.00 | 12.00 | 2.40 | 2.40 | 2.40 | 2.40 | 0.50 | 2.40 |
| Thermal treatment | | — | — | — | — | — | For 5 days at 30° C. | For 16 hrs at 40° C. | — | — | — | — |
| Film thickness of thermoplastic resin-containing layer (μm) | | 40 | 40 | 40 | 40 | 40 | 40 | 40 | 40 | 40 | 40 | 15 |
| Hardness | | 10.9 | 11.6 | 12.4 | 13.4 | 14.8 | 12.7 | 12.4 | 8.8 | 8.4 | 7.7 | 10.6 |
| Scratch strength (g) | | 60 | 65 | 66 | 71 | 82 | 70 | 68 | 49 | 48 | 39 | 60 |
| Support SRa (μm) | Cutoff 0.02 to 0.5 mm | 0.08 | 0.08 | 0.08 | 0.08 | 0.08 | 0.08 | 0.08 | 0.08 | 0.08 | 0.08 | 0.23 |
|  | Cutoff 1 to 3 mm | 0.29 | 0.29 | 0.29 | 0.29 | 0.29 | 0.29 | 0.29 | 0.29 | 0.29 | 0.29 | 0.55 |
| Recording medium SRa (μm) | Cutoff 0.02 to 0.5 mm | 0.06 | 0.07 | 0.06 | 0.06 | 0.05 | 0.06 | 0.06 | 0.06 | 0.07 | 0.06 | 0.18 |
|  | Cutoff 1 to 3mm | 0.21 | 0.22 | 0.21 | 0.2 | 0.23 | 0.21 | 0.21 | 0.22 | 0.21 | 0.21 | 0.48 |
| Image clarity (%) | | 92 | 94 | 90 | 93 | 92 | 88 | 89 | 90 | 88 | 86 | 63 |
| D/I value | | 52 | 49 | 50 | 51 | 49 | 50 | 52 | 50 | 49 | 48 | 35 |
| Bleeding over time (%) | | 24 | 20 | 28 | 26 | 18 | 22 | 26 | 45 | 32 | 35 | 22 |

As mentioned above, according to the invention, an inkjet recording medium that has excellent image clarity and scratch resistance and can excellently suppress the bleeding over time of an image can be provided.

The invention claimed is:

1. An inkjet recording medium comprising a support and an ink-receiving layer on the support wherein:

the hardness of the ink-receiving layer is 9.0 or more;

the D/I value, defined by ASTM E430, of the ink-receiving layer is 40 or more, the D/I value being the distinctness-of-image gloss, represented by the formula 100 X $(1-H_{0.3})$, evaluated at 0.3° on either or both sides of the specular angle, where $H_{0.3}$ represents 0.3° reflection haze; and the medium is subjected to a thermal treatment having a treatment at 30 degree C. or more for 15 hrs or more.

2. The inkjet recording medium of claim 1, wherein:
the center surface average roughness (SRa) of the ink-receiving layer is 0.1 μm or less when measured under the condition of cutoff of 0.02 to 0.5 mm, and 0.4 μm or less when measured under the condition of cutoff of 1 to 3 mm; and
the image clarity of the ink-receiving layer is 80% or more when measured under the condition of an optical comb width of 2.0 mm.

3. The inkjet recording medium of claim 1, wherein the ink-receiving layer comprises inorganic particles.

4. The inkjet recording medium of claim 3, wherein the inorganic particles are at least one selected from vapor-phase-process silica particles, colloidal silica, alumina particles and pseudo-boehmite.

5. The inkjet recording medium of claim 1, wherein the ink-receiving layer comprises a water soluble resin.

6. The inkjet recording medium of claim 5, wherein the water soluble resin is at least one selected from a polyvinyl alcohol based resin, a cellulose based resin, a resin having an ether bond, a resin having a carbamoyl group, a resin having a carboxyl group and gelatins.

7. The inkjet recording medium of claim 5, wherein the ink-receiving layer comprises a cross-linking agent capable of cross-linking the water soluble resin.

8. The inkjet recording medium of claim 5, wherein the ink-receiving layer comprises ammonium carbonate in an amount of 8% by mass or more relative to the water soluble resin.

9. The inkjet recording medium of claim 5, wherein the ink-receiving layer comprises a polyvalent metal compound in an amount of 0.1% by mass or more relative to the water soluble resin.

10. The inkjet recording medium of claim 9, wherein the polyvalent metal compound is zirconium ammonium carbonate.

11. The inkjet recording medium of claim 1, wherein the ink-receiving layer comprises a water soluble resin and inorganic particles; and the ratio (PB ratio) of the mass of particles to the mass of water-soluble resin is 4.5 or less.

12. The inkjet recording medium of claim 1,
wherein the support comprises one or more layers;
an outermost surface layer of the support comprises a thermoplastic resin;
the thickness of the outermost layer is 30 μm or more; and
the center surface average roughness (SRa) of the outermost layer is 0.15 μm or less when measured under a condition of cutoff of 0.02 to 0.5 mm, and 0.45 μm or less when measured under a condition of cutoff of 1 to 3 mm.

13. An inkjet recording medium comprising a support and an ink-receiving layer on the support, wherein:
the hardness of the ink-receiving layer is 9.0 or more;
the center surface average roughness (SRa) of the ink-receiving layer is 0.1 μm or less when measured under a condition of cutoff of 0.02 to 0.5 mm, and 0.4 μm or less when measured under a condition of cutoff of 1 to 3 mm; and the medium is subjected to a thermal treatment having a treatment at 30 degree C. or more for 15 hrs or more.

14. The inkjet recording medium of claim 13, wherein:
the D/I value, defined by ASTM E430, of the ink-receiving layer is 40 or more, the D/I value being the distinctness-of-image gloss, represented by the formula 100 X $(1-H_{0.3})$, evaluated at 0.3° on either or both sides of the specular angle, where $H_{0.3}$ represents 0.3° reflection haze; and
the image clarity of the ink-receiving layer is 80% or more when measured under the condition of an optical comb width of 2.0 mm.

15. The inkjet recording medium of claim 13, wherein the ink-receiving layer comprises inorganic particles.

16. The inkjet recording medium of claim 15, wherein the inorganic particles are at least one selected from vapor-phase-process silica particles, colloidal silica, alumina particles and pseudo-boehmite.

17. The inkjet recording medium of claim 13, wherein the ink-receiving layer comprises a water soluble resin.

18. The inkjet recording medium of claim 17, wherein the water soluble resin is at least one selected from a polyvinyl alcohol based resin, a cellulose based resin, a resin having an ether bond, a resin having a carbamoyl group, a resin having a carboxyl group and gelatins.

19. The inkjet recording medium of claim 17, wherein the ink-receiving layer comprises a cross-linking agent capable of cross-linking the water soluble resin.

20. The inkjet recording medium of claim 17, wherein the ink-receiving layer comprises ammonium carbonate in an amount of 8% by mass or more relative to the water soluble resin.

21. The inkjet recording medium of claim 17, wherein the ink-receiving layer comprises a polyvalent metal compound in an amount of 0.1% by mass or more relative to the water soluble resin.

22. The inkjet recording medium of claim 21, wherein the polyvalent metal compound is zirconium ammonium carbonate.

23. The inkjet recording medium of claim 13, wherein the ink-receiving layer comprises a water soluble resin and inorganic particles; and the ratio (PB ratio) of the mass of particles to the mass of water-soluble resin is 4.5 or less.

24. The inkjet recording medium of claim 13, wherein:
the support comprises one or more layers;
an outermost surface layer of the support comprises a thermoplastic resin;
the thickness of the outermost layer is 30 m or more; and
the center surface average roughness (SRa) of the outermost layer is 0.15 μm or less when measured under a condition of cutoff of 0.02 to 0.5 mm, and 0.45 μm or less when measured under a condition of cutoff of 1 to 3 mm.

* * * * *